Patented Nov. 15, 1932

1,887,602

UNITED STATES PATENT OFFICE

FRITZ STRAUB, OF BASEL, AND HERMANN SCHNEIDER AND HEINRICH BERNHARD, OF RIEHEN, NEAR BASEL, SWITZERLAND, ASSIGNORS TO SOCIETY OF CHEMICAL INDUSTRY IN BASLE, OF BASEL, SWITZERLAND

METAL COMPOUND OF AZO-DYESTUFFS AND PROCESS OF MAKING SAME

No Drawing. Application filed September 10, 1928, Serial No. 305,135, and in Switzerland September 17, 1927.

The present invention relates to the manufacture of metal compounds of azo-dyestuffs. It comprises the process of making these compounds themselves, and the material that has been dyed with the new compounds.

By the present invention valuable products—which may be defined as mixed azo-dyestuffs containing metals—are obtained by causing agents yielding metal to react on mixtures of such azo-dyestuffs which contain groups capable of fixing metal, or by causing already metallized azo-dyestuffs to react on not metallized azo-dyestuffs containing groups capable of fixing metal, these not metallized dyestuffs being identical with or different from the starting dyestuffs of the metallized product. Thus there are obtained complex metal compounds which may contain one or more metals and one or more azo-dyestuffs. The new complexes may contain only monoazo-dyestuffs or only polyazo-dyestuffs, or monoazo-dyestuffs together with polyazo-dyestuffs.

The reaction may occur in neutral, acid or alkaline medium under atmospheric pressure or under increased pressure and in presence or absence of suitable additions, such as organic or inorganic salts or substances of another kind, such as organic solvents.

As suitable metals there come into consideration those which are at least bivalent and which are further capable of yielding complex compounds. These metals may be used in the form of salts, oxides or hydroxides. Also the complex metal compounds which these compounds may form with dyestuffs containing groups capable of binding metal may be used as agents yielding metal. All these agents yielding metal may be used single or as mixtures.

The new products may also be made by performing the operation of coupling which produces the dyestuff or dyestuffs in presence of an agent yielding metal.

Finally the new products may be made in the dye-bath or on the fibre.

The dyestuffs obtained by the invention are useful not only for dyeing wool, silk or cotton, but also for dyeing or coloring leather, varnishes and other materials.

The formula of these metal compounds is not known.

The following examples illustrate the invention, the parts being by weight:—

Example 1

10 parts of the chromium compound of the dyestuff from diazotized 1-amino-2-hydroxy-naphthalene-4-sulfonic acid and α-naphthol of the formula

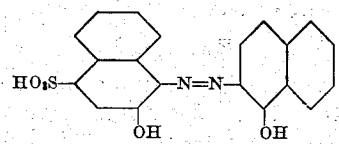

are dissolved in 250 parts of boiling water, 2 parts of the dyestuff from diazotized 6-nitro-2-aminophenol-4-sulfonic acid and β-naphthol of the formula

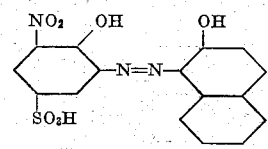

are dissolved in the solution and the whole is made feebly acid with acetic acid and boiled for a long time in a reflux apparatus. By partial evaporation and salting out the new dyestuff is obtained. The formula of this chromium compound is not known. It is a blackish powder, soluble in water and in caustic soda solution of 10 per cent. strength to a blackish blue solution and in concentrated sulfuric acid to a greenish blue solution. It dyes wool and silk blackish marine-blue tints of excellent fastness properties.

Example 2

A suspension, which has been boiled for a short time, of 45 parts of the dyestuff from the nitrated diazo-compound of 1-amino-2-hydroxynaphthalene-4-sulfonic acid and β-naphthol of the formula

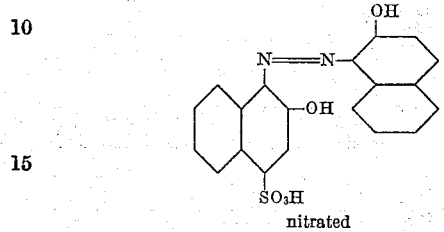
nitrated and 42 parts of the reduction product of the said dyestuff in 600 parts of water are mixed with 50 parts of crystallized sodium acetate and 55 parts of a solution of chromium formate containing 41 per cent. of $Cr_2O_3$ and the mixture is boiled for a long time in a reflux apparatus. 360 parts of saturated common salt solution are then added and boiling continued for 15 hours, after which time chroming is complete. By salting out the boiling solution, there is obtained an individual chromium compound in the form of a black powder, which dissolves in water to a blue-violet solution, in dilute caustic soda solution to a violet solution and in concentrated sulfuric acid to a blue-black solution. The formula of this chromium compound is not known. The dyestuff dyes wool and silk blue black tints having good properties of fastness.

Example 3

10 parts of the chormium compound of the azo-dyestuff from 1-amino-2-hydroxynaphthalene-4-sulfonic acid and α-hydroxynaphthalene are dissolved in 250 parts of water, while boiling. To this solution there are added 2.37 parts of the dyestuff from diazotized 2-amino-1-hydroxynaphthalene-4:8-disulfonic acid and β-hydroxynaphthalene of the formula

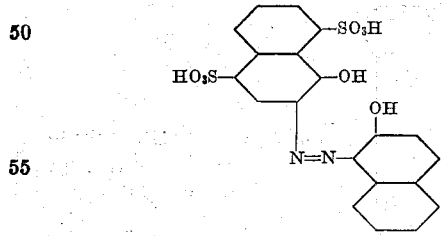

The mixture in solution thus obtained is slightly acidified by means of acetic acid and boiled for a long time in a reflux apparatus. The new dyestuff thus obtained is then separated in usual manner. It forms a blackish powder which dissolves in water to a blue, in caustic soda solution of 10 per cent. strength to a violet, and in concentrated sulfuric acid to a green-blue solution. The formula of this chromium compound is not known. It dyes wool and silk in blue tints which are exceedingly fast.

Example 4

7.88 parts of the azo-dyestuff from 1-amino-2-hydroxynaphthalene-4-sulfonic acid and β-hydroxynaphthalene of the formula

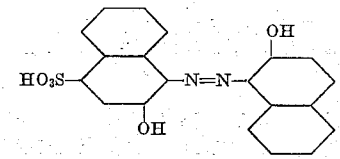

and 4.74 parts of the dyestuff from 2-amino-1-hydroxynaphthalene-4-sulfonic acid and β-hydroxynaphthalene of the formula

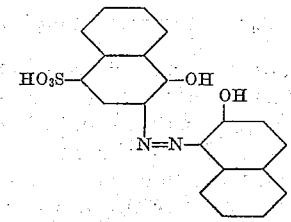

are dissolved in 300 parts of water, while boiling. To this solution there are then added 12 parts of $Cr_2O_3$ in the form of a solution containing 4 per cent. by volume of chromium fluoride, and the reaction mixture is boiled for some time in a reflux apparatus. The dyestuff thus obtained is separated in usual manner. It forms a blackish powder which dissolves in water to a violet, in caustic soda solution of 10 per cent. strength to a red-violet, and in concentrated sulfuric acid to a blackish-blue solution. The formula of this chromium compound is not known. It dyes wool and silk from an acid bath fast blue tints.

Example 5

7.88 parts of the azo-dyestuff from 1-amino-2-hydroxynaphthalene-4-sulfonic acid and β-hydroxynapthalene, and 4.7 parts of the dyestuff from 4-chloro-2-amino-1-phenol and 1:8-dihydroxynaphthalene-3:6-disulfonic acid of the formula

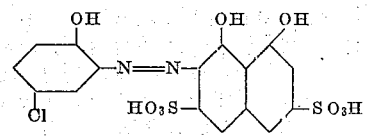

are together dissolved in 300 parts of water, while boiling. To this solution there are then added 12 parts of $Cr_2O_3$ in the form of a solution containing 4 per cent by volume of chromium fluoride, and the reaction mixture is boiled for a long time in a reflux apparatus. The new dyestuff is separated in usual manner. It forms a blackish powder which dissolves in water to a blue, in caustic soda solution of 10 per cent strength to a reddish-blue, and in concentrated sulfuric acid to a blackish solution. The formula of this chromium compound is not known. It dyes wool and silk from a bath made acid with sulfuric acid or acetic acid fast blue tints.

Example 6

5.8 parts of the monoazo-dyestuff from 1-amino-2-hydroxynaphthalene-4-sulfonic acid and 2-phenylamino-5-hydroxy-naphthalene-7-sulfonic acid of the formula

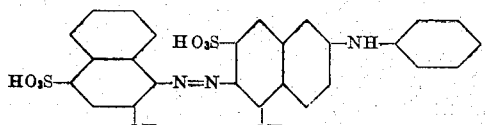

and 8.4 parts of the disazo-dyestuff from 2 mol diazotized 2-amino-1-phenol-4-sulfamide and 1 mol 5:5'-dihydroxy-2:2'-dinaphthylamino-7:7'-disulfonic acid of the formula

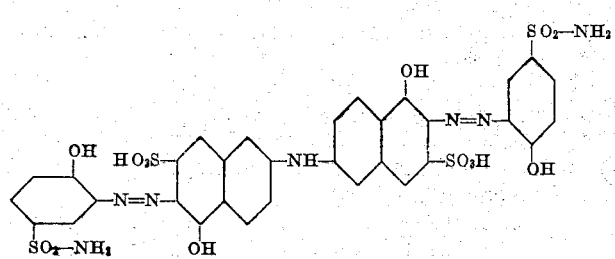

are together dissolved in 400 parts of water. After addition of a solution of chromium fluoride corresponding to 6 parts of $Cr_2O_3$ the whole is boiled for a long time in a reflux apparatus. The new metal compound is obtained by evaporation and salting out. It dissolves in water to a blue, in dilute caustic soda solution to a reddish-blue, and in concentrated sulfuric acid to a violet solution. The formula of this chromium compound is not known. The dyestuff forms a dark powder and dyes silk and wool from a bath made acid with acetic acid and viscose and cotton from a neutral bath blue tints.

Example 7

8.4 parts of the disazo-dyestuff from 2 mol 2-amino-1-phenol-4-sulfamide and 1 mol 5:5'-dihydroxy-2:2'-dinaphthylamino-7:7'-disulfonic acid and 9.3 parts of the disazo-dyestuff from 2 mol 4-nitro-6-sulfo-2-amino-1-phenol and 1 mol 5:'-dihydroxy-2:2'-dinaphthylamino-7:7'-disulfonic acid of the formula

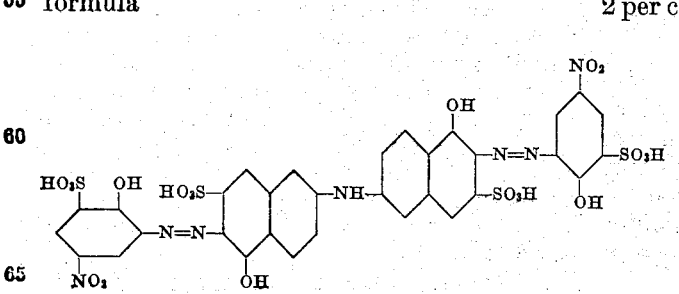

are together dissolved in 500 parts of water. To this there is added a solution of chromium fluoride corresponding to 12 parts of $Cr_2O_3$, and the whole is heated for some hours while substituting the evaporated water. The new chromium compound is obtained by concentration and salting out. The formula of this chromium compound is not known. It forms a dark powder which dissolves in water to a blue, in dilute caustic soda solution to a reddish-blue and in concentrated sulfuric acid to a reddish-blue solution, dyeing silk, viscose and cotton blue tints.

Example 8

A dye-bath is prepared with (calculated in each case on the weight of the wool) 7 per cent. of the chromium compound of the azo-dyestuff from diazotized 2-amino-1-hydroxy-naphthalene-4:8-disulfonic acid and β-naphthol of the formula

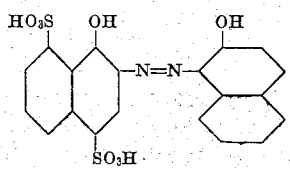

1 per cent. of the chromium compound of the azo-dyestuff from diazotized 1-amino-2-hydroxynaphthalene-4-sulfonic acid and 1(3'-sulfamido)-phenyl-3-methyl-5-pyrazolone of the formula

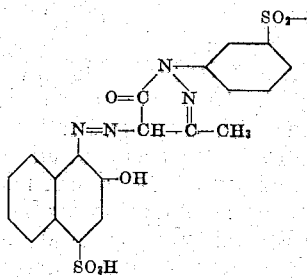

2 per cent. of the azo-dyestuff from diazotized 4-chloro-2-amino-1-phenol and 1:8-dihydroxy-naphthalene-3:6-disulfonic acid of the formula

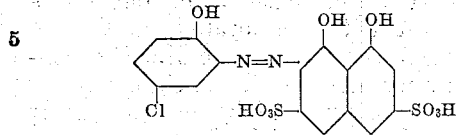

10 per cent. of Glauber's salt and 2 per cent. of concentrated sulfuric acid. 100 parts of wool are entered at 70° C. and this temperature is maintained for about 20 minutes and is then raised within half an hour to boiling; a further 6 per cent. of concentrated sulfuric acid is added and boiling continued for 1–1½ hours. The goods are then washed and dried. The wool is dyed marine-blue tints of good properties of fastness.

*Example 9*

A dye-bath is prepared with (calculated on the weight of the goods) 2.4 per cent. of the chromium compound of the azo-dyestuff from diazotized 1-amino-2-hydroxynaphthalene-4-sulfonic acid and β-naphthol of the formula

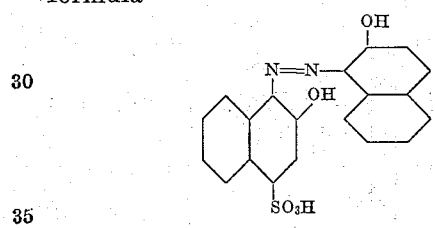

0.6 per cent. of the azo-dyestuff from diazotized 5-nitro-2-amino-1-phenol and 2-aminonaphthalene-6-sulfonic acid of the formula

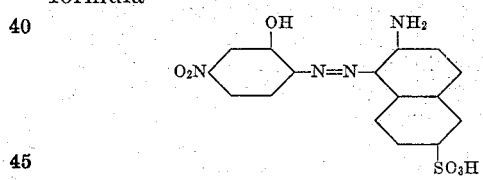

10 per cent. of Glauber's salt and 2 per cent. of acetic acid. 100 parts of wool are entered at 70° C. and this temperature is maintained for 20 minutes and then raised to boiling; 2 per cent. of concentrated sulfuric acid are added, boiling is continued for half an hour and there are added another 6 per cent. of concentrated sulfuric acid, whereupon dyeing is continued by boiling for 1–1½ hours. The goods are then washed and dried. The wool is dyed marine-blue tints of very good properties of fastness.

Instead of chromium other metals which are at least bivalent and which are further capable of yielding complex compounds may be used, such as iron, copper, manganese, nickel, cobalt, vanadium, uranium, titanium, tin or aluminium. Also more than one of these metals may be used together.

What we claim is:—

1. A process for the manufacture of metal compounds of azo-dyestuffs, consisting in treating a mixture of different azo-dyestuffs, each containing lake-forming groups, with metal compounds of metals which are at least bivalent, and which are further capable of forming complex compounds.

2. A process for the manufacture of metal compounds of azo-dyestuffs, consisting in treating a mixture of different o-hydroxy-azo-dyestuffs, with metal compounds of metals which are at least bivalent, and which are further capable of forming complex compounds.

3. A process for the manufacture of metal compounds of azo-dyestuffs, consisting in treating o-hydroxy-azo-dyestuffs with metal compounds of o-hydroxy-azo-dyestuffs of metals which are at least bivalent and which are further capable of forming complex compounds.

4. A process for the manufacture of metal compounds of azo-dyestuffs, consisting in treating a mixture of different o-hydroxy-azo-dyestuffs, with trivalent compounds of chromium.

5. As new products the new metal compounds which are obtained by treating a mixture of different azo-dyestuffs, each containing lake-forming groups, with metal compounds of metals which are at least bivalent, and which are further capable of forming complex compounds, which products form dark to black powders, dissolving in water to blue-black to blue-violet solutions and in dilute caustic soda solution to a more or less pure violet solution, dyeing wool and silk bluish-black tints having good properties of fastness.

6. As new products the new metal compounds which are obtained by treating a mixture of different azo-dyestuffs, each containing lake-forming groups, with trivalent compounds of chromium, which products form dark to black powders, dissolving in water to blue-black to blue-violet solutions and in dilute caustic soda solution to a more or less pure violet solution, dyeing wool and silk bluish-black tints having good properties of fastness.

7. As new products the new metal compounds which are obtained by treating mixtures of different monoazo-dyestuffs, each containing lake-forming groups, with metal compounds of metals which are at least bivalent, and which are further capable of forming complex compounds, which products form dark to black powders, dissolving in water to blue-black to blue-violet solutions and in dilute caustic soda solution to a more or less pure violet solution, dyeing wool and silk bluish-black tints having good properties of fastness.

8. As new products the new metal compounds which are obtained by treating mixtures of monoazo-dyestuffs, each containing lake-forming groups, with trivalent compounds of chromium, which products form dark to black powders, dissolving in water to blue-black to blue-violet solutions and in dilute caustic soda solution to a more or less pure violet solution, dyeing wool and silk bluish-black tints having good properties of fastness.

9. As new products the new metal compounds which are obtained by treating azo-dyestuffs with metal compounds of o-hydroxy-azo-dyestuffs of metals which are at least bivalent and which are further capable of forming complex compounds, which products form black to dark powders, dissolving in water to blue-black to blue-violet solutions and in dilute caustic soda solution to a more or less violet solution, dyeing wool and silk bluish-black tints having good properties of fastness.

10. A process of producing complex chromium compounds of o-hydroxy-azo dyestuffs containing less than 1 atom of chromium to each chromable group of the dyestuff molecule which comprises acting, at an elevated temperature, on a fully chromed o-hydroxy-azo dyestuff with a chromium-free o-hydroxy-azo dyestuff.

11. A process of producing complex chromium compounds of o-hydroxy-azo dyestuffs containing less than 1 atom of chromium to each chromable group of the dyestuff molecule which comprises acting, at an elevated temperature, on a fully chromed o-hydroxy-azo dyestuff with a chromium-free o-hydroxy-azo dyestuff which is different from that of the chromiferous azo dyestuff.

12. As new articles of manufacture, complex chrominum compounds which are obtained by heating a fully chromed o-hydroxy-azo dyestuff with a chromium-free o-hydroxy-azo dyestuff which is different from that of the chromiferous azo dyestuff.

In witness whereof we have hereunto signed our names this 30th day of August, 1928.

FRITZ STRAUB.
HERMANN SCHNEIDER.
HEINRICH BERNHARD.